US012309325B1

(12) United States Patent
Arsanjani et al.

(10) Patent No.: US 12,309,325 B1
(45) Date of Patent: *May 20, 2025

(54) INTERACTIVE ROUTING OF DATA COMMUNICATIONS

(71) Applicant: 8x8, Inc., Campbell, CA (US)

(72) Inventors: Ali Arsanjani, Campbell, CA (US); Bryan R. Martin, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,607

(22) Filed: Jan. 10, 2024

Related U.S. Application Data

(63) Continuation of application No. 18/105,612, filed on Feb. 3, 2023, now Pat. No. 11,924,381, which is a
(Continued)

(51) Int. Cl.
*H04M 3/533* (2006.01)
*G06F 40/20* (2020.01)
*G10L 25/63* (2013.01)
*H04M 1/656* (2006.01)
*H04M 1/658* (2006.01)
*H04M 3/42* (2006.01)
*H04M 3/493* (2006.01)
*H04M 3/51* (2006.01)

(52) U.S. Cl.
CPC ............ *H04M 3/533* (2013.01); *G06F 40/20* (2020.01); *G10L 25/63* (2013.01); *H04M 1/656* (2013.01); *H04M 1/658* (2013.01); *H04M 3/42221* (2013.01); *H04M 3/4936* (2013.01); *H04M 3/5175* (2013.01); *H04M 2201/40* (2013.01)

(58) Field of Classification Search
CPC ...... H04M 3/533; H04M 1/656; H04M 1/658; H04M 3/42221; H04M 3/4936; H04M 3/5175; H04M 2201/40; G06F 40/20; G10L 25/63
See application file for complete search history.

(56) References Cited

U.S. PATENT DOCUMENTS 6,411,947 B1 * 6/2002 Rice .................... G06Q 10/107
706/46
8,095,613 B1 * 1/2012 Perkowitz ............ G06Q 10/109
709/206
(Continued)

*Primary Examiner* — Lisa Hashem
(74) *Attorney, Agent, or Firm* — Crawford Maunu PLLC

(57) ABSTRACT

Certain aspects of the disclosure are directed to monitoring user-data communications corresponding to a user-generated message. According to a specific example, user-data communications, which are addressed to a client among a plurality of remotely-situated client entities, are directed to a message recording system. Each of the plurality of remotely-situated client entities are respectively configured and arranged to interface with a data communications server providing data communications services on a subscription basis. During recording of a message associated with the user-data communications and on the message recording system, speech characteristic parameters of the message may be analyzed, and a sentiment score and a criticality score for the message, may be determined. During the recording of the message, the user-data communications may be routed based on the determined sentiment score and criticality score.

20 Claims, 4 Drawing Sheets

Related U.S. Application Data continuation of application No. 16/217,927, filed on Dec. 12, 2018, now Pat. No. 11,575,791.

(56) References Cited

U.S. PATENT DOCUMENTS

| | | | | |
|---|---|---|---|---|
| 9,420,106 | B1* | 8/2016 | Thirugnanasundaram | H04M 3/5191 |
| 9,911,134 | B2* | 3/2018 | Gupta | H04L 51/52 |
| 10,063,497 | B2* | 8/2018 | Snider | H04L 67/535 |
| 10,841,424 | B1* | 11/2020 | Lemus | H04M 3/5175 |
| 11,575,791 | B1* | 2/2023 | Arsanjani | H04M 3/5175 |
| 11,902,469 | B1* | 2/2024 | Mappus, IV | H04M 3/5235 |
| 11,924,381 | B1* | 3/2024 | Arsanjani | G06F 40/284 |
| 11,948,577 | B1* | 4/2024 | Liu | H04M 3/5183 |
| 2013/0262320 | A1* | 10/2013 | Makanawala | H04L 51/52 705/304 |
| 2024/0187524 | A1* | 6/2024 | Koneru | H04M 3/5166 |

* cited by examiner

INTERACTIVE ROUTING OF DATA COMMUNICATIONS

OVERVIEW

Aspects of various embodiments are directed to interactive routing of data communications. Data communications platforms have allowed individuals to transmit and receive data communications using broadband Internet connections in place of traditional telephone lines. A data communications endpoint device can use a broadband Internet connection to connect to a data communications server that is managed by a data communications service provider. The data communications server can handle communication routing and provide other data communications services for the data communications endpoint device.

Computing servers are increasingly being used to provide various data communications services over a network including, but not limited to, routing of Voice over Internet Protocol (VOIP) communications and/or data service providers for providing communications services such as messaging, video conferencing, management of data communications exchange servers, packet switching, traffic management, website hosting, remote data storage, remote computing services, and management of virtual computing environments, among other examples. For ease of reference, the various applications, systems and services that may be provided by such computing servers may be collectively referred to as data communications services. Network management systems, sometimes referred to as enterprise management systems, are often used to administer and monitor enterprise computer systems. These network management systems may have hundreds or thousands of settings, rules, and thresholds. The defaults for these settings, rules, and thresholds may be inaccurate and typically are not customized or tailored to a client entity. Because of inaccurate settings, rules, and thresholds, many network management systems provide inaccurate results, excessive amounts of unnecessary information, or irrelevant information and can fall into disuse over time.

Moreover, when a customer contacts a service provider, a first available customer service representative may work with the customer to respond to the communication. However, in some instances, such a customer service representative may be unavailable, and/or the customer may otherwise be routed to a message recording system. The customer's communication may be of an urgent nature or otherwise of high importance to the service provider, though without communication with the customer service representative, the communication may go unaddressed in a timely manner. Moreover, the customer service representative to which the communication was originally directed may lack the expertise to resolve the service issue for the customer. Accordingly, the customer service representative may have to route the customer to a different representative of the wireless telecommunication carrier in order to resolve the service issue. In rare instances, the customer may be routed to multiple new representatives in succession until the service issue is resolved. Such policies for handling customer care requests may leave a customer with the impression that the customer service representatives of the carrier are not dedicated to provide high quality customer service.

SUMMARY

Various example embodiments are directed to issues such as those addressed above and/or others which may become apparent from the following disclosure concerning systems and methods for interactive routing of data communications.

Embodiments are directed toward methods for use in communications systems employing a data communications server operated by a communications provider, where the data communications server is on the data communications provider side, to provide data communications services to a multitude of client entities. In such contexts, the data communications server may be referred to as a data-center communications server. In such systems, the data-center communications server includes one or more computer processor circuits (configured with access to databases stored in memory circuits) and configured to act as a communications-control engine for routing, processing communications and/or providing related communications services on behalf of client entities. Such client entities may be exemplified as businesses with employees ranging in number from just a few to thousands, and being located/mobile for communications services in any of a multitude of venues.

In accordance with the present disclosure, user-data communications corresponding to a user-generated message may be monitored, and handled according to a set of client specific rules. Such user-data communications may be directed or otherwise routed to a message recording system, where the user-data communications are addressed to a client among a plurality of remotely-situated client entities, each respectively configured and arranged to interface with a data communications server providing data communications services on a subscription basis.

The received user-data communications may be routed via the data communications server. For instance, during recording of a message associated with the user-data communications and on the message recording system, speech characteristic parameters of the message may be analyzed. A sentiment score and a criticality score for the message may then be determined. As used herein, the sentiment score refers to or includes a numerical value associated with an overall sentiment of the recorded message. The sentiment score may be based at least in part on the analyzed speech characteristic parameters. As used herein, the criticality score refers to or includes a numerical value associated with an overall importance of the recorded message, determined at least in part by key words included in the recorded message. The criticality score may be based at least in part on tone and/or words used in the message.

During the recording of the message, the user-data communications may be routed based on the determined sentiment score and criticality score. While examples herein are described with regards to analyzing speech characteristic parameters, it is noted that the user-data communications may correspond to user-generated audible messages or non-voice user-generated messages. For instance, user-generated audible messages may include voicemails, and non-voice user-generated messages may include email messages, text messages, and/or chat messages, among others. In example embodiments in which the user-generated message includes a user-generated audible message, a transcript of the user-generated audible message may be generated and used to determine the sentiment score and/or criticality score, as discussed more thoroughly herein.

In a particular example embodiment, the user-data communication may include a voice communication. For instance, the voice communication may be addressed to a particular client among a plurality of remotely-situated client entities. Each respective client entity can be configured and arranged to interface with a data communications server providing data communications services on a subscription basis, and each of the plurality of remotely-situated client entities can be associated with a respective client-managed server. In such embodiments, the voice communication may be routed and/or directed to a message recording system.

During recording of a message via the message recording system, the voice communication may be routed for the particular client entity, and according to preferences and/or instructions for the particular client entity. During recording of the message, speech characteristic parameters of the message may be analyzed, and a sentiment score and a criticality score for the message may be determined based on the analyzed speech characteristic parameters. In various example embodiments, the plurality of speech characteristic parameters may be identified by analyzing at least one of words and tones of voice communications previously received by the plurality of remotely-situated client entities, and correlating the plurality of speech characteristic parameters with a particular sentiment. A plurality of speech characteristic parameters may be identified by the client entity, such as via a client-managed server, by analyzing words and/or tones of voice communications previously received by the plurality of remotely-situated client entities. The plurality of speech characteristic parameters may be correlated with a particular criticality indicative of an overall importance of the recorded message.

Once the sentiment score and criticality score for a particular data communication is identified, a set of client-specific communication handling rules associating sentiment scores and criticality scores with communication handling processes may be retrieved from the data-center communications server. Such client-specific communication handling rules may specify a manner in which data communications with particular sentiment scores and/or criticality scores are to be handled for particular client entities. During the recording of the message, the voice communication may be routed according to the client-specific communication handling rules.

In various example embodiments, thresholds identified by the client entity, such as via a client-managed server, may delineate ranges for a plurality of sentiment scores. In such example embodiments, each respective sentiment score may include a numerical value associated with an overall sentiment of the recorded message, determined by at least one of a frequency of audio of the recorded message, a wavelength or velocity of the recorded message, and an amplitude of the recorded message. Similarly, thresholds identified by the client entity, such as via a client-managed server, may delineate ranges for a plurality of criticality scores, each respective criticality score including a numerical value associated with an overall importance of the recorded message, determined at least in part by key words included in the recorded message.

In an additional embodiment, an apparatus may monitor user-data communications corresponding to a user-generated message. In such embodiments, the apparatus may include a computing server configured and arranged to interface with a plurality of remotely-situated client entities to provide data communications services on a subscription basis, and a processing circuit communicatively coupled to the computing server. The processing circuit can be configured and arranged to monitor the user-data communications. For instance, for each of the plurality of remotely-situated client entities, the processing circuit directs a user-data communication, such as a received voice communication, to a message recording system. As described herein, the user-data communication (e.g., the voice communication in the aforementioned illustration) is addressed to a client among a plurality of remotely-situated client entities. During recording of a message associated with the received voice communication and on the message recording system, the processing circuit analyzes speech characteristic parameters of the message, and determines a sentiment score and criticality score for the message based on the analyzed speech characteristic parameters. The voice communication and/or the recorded message may be classified at least in part based on the sentiment score or the criticality score. The processing circuit can subsequently retrieve from a database communicatively coupled to the processing circuit and the computing server, a set of rules associating the voice communication with at least one communication handling process. As described herein, the communication handling processes may be specific to each respective client entity. As such, the processing circuit can, during recording of the message, process the voice communication according to the set of rules associated with the respective client entity.

In various embodiments, the processing circuit is configured and arranged to determine the sentiment score and the criticality score for the message by identifying key words in the message. The key words may be identified by analyzing the natural language of the message during recording of the message. Using natural language processing and/or other word recognition means, the processing circuit may determine at least one topic of the recorded message, and classify the received voice communication based at least in part on the identified key words.

In various embodiments, the speech characteristic parameters include a tone of the message, where the tone includes measurable audio parameters such as a frequency of audio in the message, a wavelength or velocity of the audio in the message, an amplitude of the audio in the message, and a combination thereof. In such embodiments, the processing circuit may be configured and arranged to determine the sentiment score and the criticality score for the message The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1A:
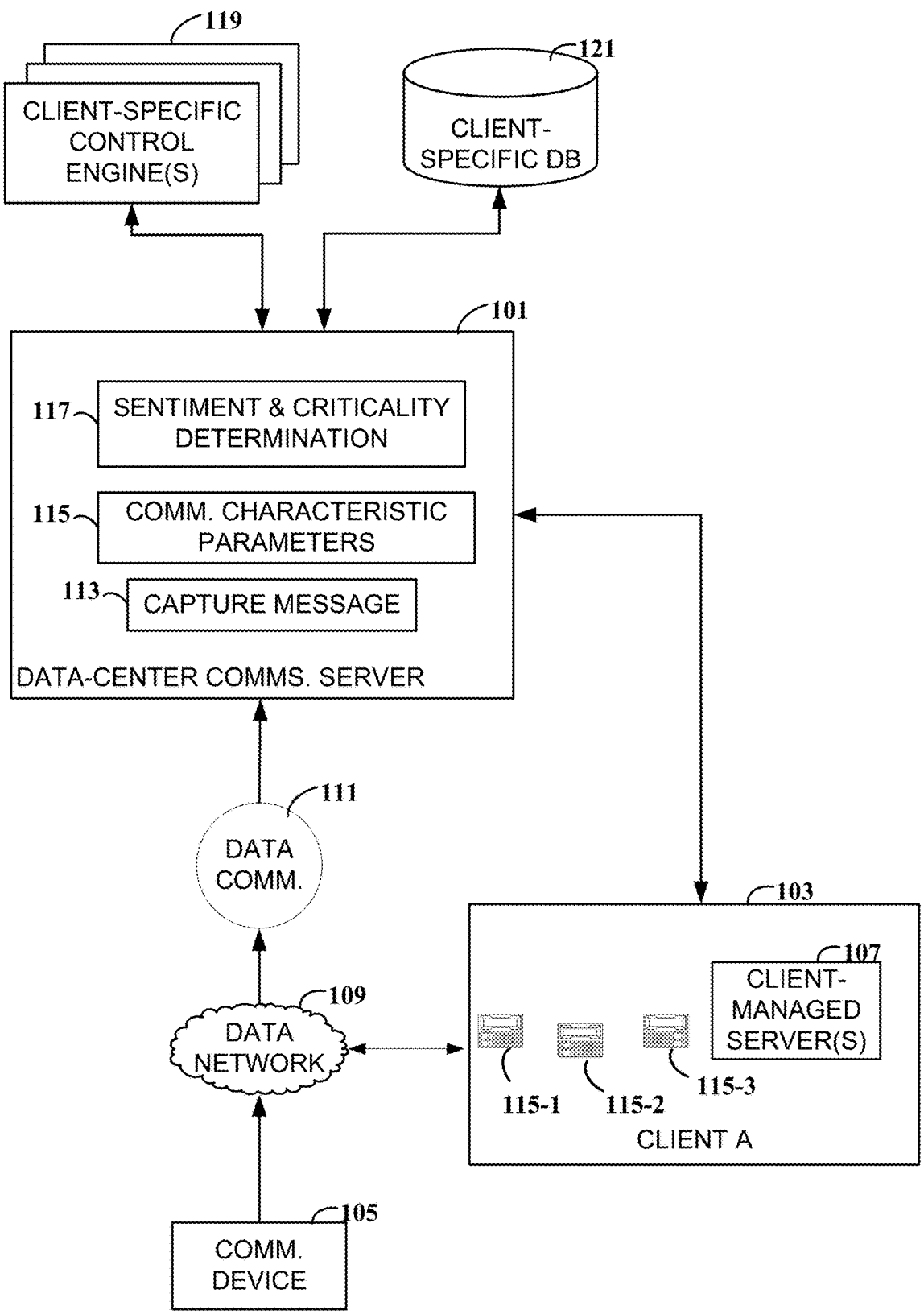
FIG. 1A illustrates a block diagram of an example system for monitoring user-data communications corresponding to a user-generated message, consistent with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving interactive routing of data communications. In certain implementations, aspects of the present disclosure have been shown to be beneficial when used in the context of providing data communications services. While the present disclosure is not necessarily limited to such data communications systems as described herein, for purposes of facilitating understanding and appreciation of certain embodiments, the following discussion uses such data communications-based services and systems in the context and on behalf of communications platforms of client entities which subscribe to such services from a data communications service provider (with a server).

Particularly, embodiments of the present disclosure are directed to techniques for using machine learning-based algorithms to route data communications in a data communications network. This machine learning-based data communications routing system may provide a proactive monitoring solution to rapidly assess the content, classification, severity, sentiment and/or topic of data communications and create predictive models for received data communications. The proactive monitoring solution of the present disclosure can collect data into an event timeline, indicating events that transpired in previous data communications, as well as an overall result and/or sentiment of the data communications. By correlating aspects of the data communication, such as key words, phrases, tone, sentiment, and/or other recognizable features and correlating such features with the overall result and/or sentiment of the data communication, predictive models can be created for the extrapolation of future data communications. Moreover, promptly and correctly routing data communications may improve effective data communications management. Such data communications may consist of telephone calls, emails, text messages, chat messages, and the like.

In accordance with the present disclosure, user-data communications corresponding to a user-generated message may be monitored, and handled according to a set of client specific rules. User-data communications may be directed to a message recording system, where the user-data communications are addressed to a client among a plurality of remotely-situated client entities, each of the plurality of remotely-situated client entities respectively configured and arranged to interface with a data communications server providing data communications services on a subscription basis. The received user-data communications may be routed via the data communications server. For instance, during recording of a message associated with the user-data communications and on the message recording system, speech characteristic parameters of the message may be analyzed. A sentiment score and a criticality score for the message may then be determined, where the sentiment score is based at least in part on the analyzed speech characteristic parameters, and the criticality score is based at least in part on tone and/or words used in the message. As such, during the recording of the message, the user-data communications may be routed based on the determined sentiment score and criticality score.

While examples herein are described with regards to analyzing speech characteristic parameters, it is noted that the user-data communications may correspond to user-generated audible messages or non-voice user-generated messages. For instance, user-generated audible messages may include voicemails, and non-voice user-generated messages may include email messages, text messages, and/or chat messages, among others. In example embodiments in which the user-generated message includes a user-generated audible message, a transcript of the user-generated audible message.

In a particular example embodiment, the user-data communications may include a voice communication. For instance, the voice communication may be addressed to a particular client among a plurality of remotely-situated client entities. Each respective client entity can be configured and arranged to interface with a data communications server providing data communications services on a subscription basis, and each of the plurality of remotely-situated client entities can be associated with a respective client-managed server. In such embodiments, the voice communication may be directed to a message recording system. During recording of a message associated with the voice communication, the voice communication may be routed for the particular client entity. During recording of the message, speech characteristic parameters of the message may be analyzed, and a sentiment score and a criticality score for the message may be determined based on the analyzed speech characteristic parameters. In various example embodiments, the plurality of speech characteristic parameters may be identified by analyzing at least one of words and tones of voice communications previously received by the plurality of remotely-situated client entities, and correlating the plurality of speech characteristic parameters with a particular sentiment. A plurality of speech characteristic parameters may be identified by the client entity, such as via a client-managed server, by analyzing words and/or tones of voice communications previously received by the plurality of remotely-situated client entities. The plurality of speech characteristic parameters may be correlated with a particular criticality indicative of an overall importance of the recorded message.

Once the sentiment score and criticality score for a particular data communication is identified, a set of client-specific communication handling rules associating sentiment scores and criticality scores with communication handling processes may be retrieved from the data-center communications server. Such client-specific communication handling rules may specify a manner in which data communications with particular sentiment scores and/or criticality scores are to be handled for particular client entities. During the recording of the message, the voice communication may be routed according to the client-specific communication handling rules.

In various example embodiments, thresholds identified via the client entity, such as via a client-managed server, may delineate ranges for a plurality of sentiment scores. In such example embodiments, each respective sentiment score may include a numerical value associated with an overall sentiment of the recorded message, determined by at least one of a frequency of audio of the recorded message, a wavelength or velocity of the recorded message, and an amplitude of the recorded message. Similarly, thresholds identified via the client entity, such as via a client-managed server, may delineate ranges for a plurality of criticality scores, each respective criticality score including a numerical value associated with an overall importance of the recorded message, determined at least in part by key words included in the recorded message.

In an additional embodiment, an apparatus may monitor user-data communications corresponding to a user-generated message. In such embodiments, the apparatus may include a computing server configured and arranged to interface with a plurality of remotely-situated client entities to provide data communications services on a subscription basis, and a processing circuit communicatively coupled to the computing server. The processing circuit can be configured and arranged to monitor the user-data communications. For instance, for each of the plurality of remotely-situated client entities, the processing circuit directs a user-data communication, such as a received voice communication, to a message recording system. As described herein, the user-data communication (e.g., the voice communication in the aforementioned illustration) is addressed to a client among a plurality of remotely-situated client entities. During recording of a message associated with the received voice communication and on the message recording system, the processing circuit analyzes speech characteristic parameters of the message, and determines a sentiment score and criticality score for the message based on the analyzed speech characteristic parameters. The voice communication and/or the recorded message may be classified at least in part based on the sentiment score or the criticality score. The processing circuit can subsequently retrieve from a database communicatively coupled to the processing circuit and the computing server, a set of rules associating the voice communication with at least one communication handling process. As described herein, the communication handling processes may be specific to each respective client entity. As such, the processing circuit can, during recording of the message, process the voice communication according to the set of rules associated with the respective client entity.

In various embodiments, the processing circuit is configured and arranged to determine the sentiment score and the criticality score for the message by identifying key words in the message. The key words may be identified by analyzing the natural language of the message during recording of the message. Using natural language processing or other word recognition means, the processing circuit may determine at least one topic of the recorded message, and classify the received voice communication based at least in part on the identified key words.

The speech characteristic parameters may include a tone of the message, where the tone includes measurable audio parameters such as a frequency of audio in the message, a wavelength or velocity of the audio in the message, an amplitude of the audio in the message, and a combination thereof. In such embodiments, the processing circuit may be configured and arranged to determine the sentiment score and the criticality score for the message by identifying the tone of the message.

At least one machine learning-based algorithm may assist in the effective and efficient routing of data communications. For instance, previous communications between parties may be scaled and/or correlated with a particular outcome and/or sentiment. After the completion of a communication, feedback may be obtained from the communicating parties, which assists in the determination of the overall sentiment and/or criticality of the completed communication. Aspects of the completed communication may then be compared to subsequent communications in order to identify the overall sentiment and/or criticality of the subsequent communications. New (e.g., subsequent) data-communications may be compared against the previous communications to determine a likely outcome and/or sentiment of the new data-communication.

In various example embodiments, information about each respective client entity may be incorporated in the determination of outcome and/or sentiment. For instance, the processing circuit communicatively coupled to the computing server may be configured and arranged to maintain the database storing rules associating sentiment scores and criticality scores with various communication handling processes. The database may include customer relationship management data, and context information associated with particular clients among the plurality of remotely-situated client entities. The processing circuit may receive as input, information correlating particular keywords, speech characteristic parameters, urgency rankings or client information to a particular communication handling process, and update the database to associate the particular keywords, speech characteristic parameters, criticality information or client information to the particular communication handling process.

Various processes may be implemented to determine a sentiment and/or criticality score for a particular communication. For instance, the processing circuit may be configured and arranged to determine the criticality of the voice communication based on a determined topic of the voice communication, a determined sentiment of the voice communication, or an identity of an individual or organization which originated the voice communication. As an illustration, one customer of a client entity may be a high-value client which demands immediate and personal attention when requests are received, whereas a second customer of the client may be less demanding in terms of timeliness of communication responses. For the high-value/high-demand clients, the client entity may specify that incoming communications are handled differently than for other clients (e.g., such communications are immediately routed to a live agent, and/or to particular individuals). As another illustration, particular individuals and/or organizations may be associated with a particular level of risk for the client entity, and different handling processes are implemented according to the increased risk.

In various embodiments, the sentiment and/or criticality of a data communication may be identified based on previous communications and/or previous interactions with a particular customer. As such, the processing resource communicatively coupled to the data-communications server may be configured and arranged to access customer relationship management (CRM) data, and communications services accessed by the plurality of remotely-situated client entities, the communications services including an email system and a text-based chat system. A context of the voice communication may be identified based on the CRM data, information in the email system, or information in the text-based chat system, and the sentiment score or the criticality score may be determined based at least in part on the identified context of the voice communication.

Various handling processes may be implemented in response to the sentiment score and/or criticality score of a given data communication meeting or exceeding a particular threshold. As an illustration, in embodiments where the data-communication is a voice communication, the processing circuit may process the voice communication by interrupting recording of the message and routing the voice communication to a live operator, responsive to a threshold for the sentiment score or the criticality score being satisfied.

Similarly, the processing circuit may process the voice communication by sending a message to a recipient of the voice communication, responsive to a threshold for the sentiment score or the criticality score being satisfied, and/or send the message to the recipient by email or text message during recording of the message. Additionally and/or alternatively, a selectable option may be provided to answer the voice communication during the recording of the message, responsive to the threshold for the sentiment score or the criticality score being satisfied.

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the different diagrams can refer to the same elements, more specific embodiments, or additional instances of the same element. Also, although aspects and features may in some cases be described in individual figures, it will be appreciated that features from one figure or embodiment can be combined with features of another figure or embodiment even when the combination is not explicitly shown or explicitly described as a combination. For ease of explanation, some examples may be primarily described with reference to data communications servers configured to provide data communication services for endpoints of a plurality of different client accounts. It is understood that the various examples may be adapted for use with computer servers configured to provide various other remote services, including, but not limited to: website hosting, remote data storage, remote computing services, virtual computing environments, enterprise communications, virtual contact center, and other services.

According to certain embodiments, a data communications system may be configured to allow a client-specific control engine to dynamically modify and control the communication flow and processing at different levels within the system, including (re) routing of incoming communications.

Rules of various complexity can be used for routing incoming communications, whether to one or more receptionists, directly to extensions, to voicemail, or for other communication routing purposes. Similarly, rules of various complexity can be used to control devices associated with particular client entities. The logic used for the control of the networked devices can be based upon directives and related data shared across multiple PBXs, data that can be dynamically changed, and upon rules and logic that can be defined according to multiple tiers of communication routing decisions. For example, a large company may have many different offices or store locations. Portions of the communication routing and processing can be shared across the entire company. Other portions could be shared with subsets or groups (e.g., groups based upon geographic regions or countries or based upon different company divisions). Still further portions can be set based upon individuals being called. Such aspects can facilitate the configuration, management, and updating the data communication system, particularly in situations where there are many thousands of extension rules can be a difficult proposition.

The data communication system described herein provides inbound and outbound communication routing for a data communications system. The data communications system may be configured as a Platform as a Service (PaaS) that provides a user with access to, among other things, telephone communication routing control, PBX functions, computer telephony integration (CTI), and data analytics (in this context the user can refer to, e.g., person, group, server or CPU, or subscribing business entity).

The client-specific sets of control data may define a manner in which various networked devices (e.g., endpoint devices) are controlled via the data communications system. For example, various endpoint devices may be capable of voice interaction, music playback, making to-do lists, setting alarms, streaming podcasts, playing audiobooks, and providing weather, traffic, and other real time information, such as news. In such examples, the client-specific sets of control data may specify how frequently the networked devices collect data and how frequently data is communicated between various networked devices.

Similarly, client-specific sets of control data may define a manner in which endpoint devices may be controlled and/or monitored by the data communications system. For example, networked devices (e.g., IoT) may include devices for home automation (also known as smart home devices) that control automation of lighting, heating (like a smart thermostat), ventilation, air conditioning (HVAC) systems, and appliances such as washer/dryers, robotic vacuums, air purifiers, ovens, or refrigerators/freezers. The client-specific sets of control data may define a manner in which such networked devices communicate with the data communications system, a manner in which they communicate with one another, various parameters for remote monitoring of the networked devices, and the like. In some examples, the client-specific sets of control data may specify particular individuals and/or groups of individuals associated with a client entity that may access and/or control the networked devices associated with the client entity, using the data communications system.

Turning now to the figures, FIG. 1A illustrates a block diagram of an example system for monitoring user-data communications corresponding to a user-generated message, consistent with the present disclosure. For example, a data communications device 105, such as may be used by a customer of a client entity, may send a user-data communication to a client. For instance, customer Jeff Smith may call ABC Company with a question about a product that he purchased. The phone call placed by Jeff Smith (e.g., the user-data communication) may originate from Jeff Smith's device 105. Communications device 105 includes circuitry configured and arranged to facilitate data communications with client A, as well as a data-center communications server 101. The user-data communication (e.g., Jeff Smith's phone call) may be communicated to the client (e.g., client A 103), via a data network 109. The data network may be communicatively coupled to a data-center communications server 101, such as may be provided by a data communications server providing data communications services on a subscription basis.

The user-data communication may be routed to the client entity, as described here. In the event that the communication is not answered (e.g., the customer must leave a message), and/or due to the nature of the communication (e.g., the data communication is a message in and of itself), the data-center communications server 101 may analyze the sentiment and criticality of the message, and handle the message in accordance with rules specified by the client. For example, if Jeff Smith's communication to ABC Company is a voice call, and if Jeff Smith's call goes unanswered, then his communication would be routed to a message recording system such as a voicemail system. During recording, Jeff Smith's message would be analyzed by the data-center communications server. For instance, the communication sent from Jeff Smith may first be sent to the client entity (e.g., Client A). If the communication is not answered by Client A, then the communication may be sent to a message recording system. In some embodiments, the message recording system may be managed and/or hosted by the client entity. Additionally and/or alternatively, the message recording system may be managed and/or hosted by the data-center communications server (e.g., by a communications service provider).

Once the customer begins recording, typing, communication, and/or generating the data communication 111, the data-center communications server may analyze and route the user-data communications. For instance, at 113, the data-center communications server may capture the message left by the communication device 105. Continuing with the example above, Jeff Smith may leave a voicemail for Client A. While Jeff Smith is leaving a voicemail, a transcript of his voicemail may be generated. While the examples provided herein discuss a data communication including a voice call and a generated voicemail, it is noted that examples are not so limited. The data communication and resulting message may include non-voice messages as well. Accordingly, the message associated with the user-data communications may correspond to a user-generated audible message or a non-voice user-generated message. As an illustration, the non-voice user-generated message may include an email or a text message. Examples are not so limited, however, and additional and/or different types of voice and/or non-voice user-generated messages may be generated.

During recording of a message associated with the user-data communications and on the message recording system, speech characteristic parameters of the message may be analyzed. For example, while Jeff Smith is recording his voicemail, he may mention a particular project such as "I am calling regarding project purple, and have some questions that I would like to discuss." Project purple may be flagged as an important project by client A, such that the mention of project purple results in specific handling of the voicemail. Additionally and/or alternatively, Jeff Smith may make disparaging remarks that indicate he is unhappy. For instance, he may say "I am exceptionally disappointed with the level of service which I have received, particularly from service representative Jane Doe. She has failed to communicate with me, she has missed key deadlines, and I demand that I am compensated for lost time!" Because of the keywords "disappointed," "failed," "I demand" identified in the message, Jeff Smith's message may be flagged for special handling to mitigate his level of dissatisfaction.

Regardless of the format of Jeff Smith's communication to client A (e.g., whether it is a voice call, a text message, and an email message, etc.), the data-center communications server may analyze the contents of the message. For instance, in the example that Jeff Smith's communication is a voice call, the data network 109 may direct a voice communication (e.g., data communication 111) to a message recording system, such as may be hosted by the data-center communications server 101. In such example embodiments, the voice communication is directed to a particular client (e.g., client A 103) among a plurality of remotely-situated client entities. Each of the plurality of remotely-situated client entities is configured and arranged to interface with a data communications server providing data communications services on a subscription basis, and each of the plurality of remotely-situated client entities associated with a respective client-managed server 107. As illustrated in FIG. 1, each of the remotely-situated client entities may be associated with a plurality of end-user communications devices, which include circuitry configured and arranged to facilitate transmission of the data communications services provided by the data communications server 101.

As described herein, the data-center communications server 101 and/or the client managed server 107 may facilitate the routing of voice communications associated with a particular client entity (in the example of FIG. 1, client A 103). For instance, during recording of a message associated with the voice communication and on the message recording system, speech characteristic parameters of the message may be analyzed. In some embodiments, the client managed server 107 may analyze the speech characteristic parameters at 115. In other embodiments, the data-center communications server 101 may analyze the speech characteristic parameters. In yet further embodiments, both the client managed server 107 and the data-center communications server 101 may analyze the speech characteristic parameters for a redundant system. As used herein, the speech characteristic parameters refer to or include factors that assist in identifying a sentiment, topic, and/or issue of a particular communication. Speech characteristic parameters may include key words, phrases, a combination of key words and phrases, and/or measurable audio values including a wavelength or velocity of the recorded message, and an amplitude of the recorded message.

The data-center communications server 101 may determine a sentiment score and a criticality score for the message based on the analyzed speech characteristic parameters, at 117. The sentiment score, as used herein, refers to or includes a numerical value associated with an overall sentiment of the recorded message. A criticality score refers to or includes a numerical value associated with an overall importance of the recorded message. The sentiment score and the criticality score for a particular message may differ between respective client entities. For instance, a particular sentiment for one client entity may be negative and indicative of a client service issue, whereas the same sentiment for another client entity may be positive and not indicative of a client service issue. Similarly, particular topics, key words, phrases, or combinations thereof may be associated with a highly critical (e.g., important) project for one client entity, and not important for another client entity. Accordingly, the data-center communications server 101 may be communicatively coupled to a client-specific database 121, and/or a plurality of client specific databases. The client specific database 121 may store correlations for each respective client entity served by the data communications provider, associating key words, phrases, combinations of key words and phrases, and measurable audio values with different respective sentiment scores. Similarly, the client specific database 121 may store correlations for each respective client entity served by the data communications provider, associating key words, phrases, and combinations of key words and phrases, with different respective criticality scores.

Each such client entity may specify a threshold range for sentiment scores and a threshold range for criticality scores which trigger respective actions by the data-center communications server. Accordingly, the client specific database 121 may maintain a set of rules associating sentiment scores and criticality scores with various communication handling processes. For instance, one client entity may specify that messages with a sentiment score above a particular threshold, and/or messages with a criticality score above a particular threshold should be routed to an agent within the organization, rather than leaving the caller to leave a message. As another illustration, a client entity may specify that messages with a sentiment score above a particular threshold, and/or messages with a criticality score above a particular threshold should trigger the generation of a message (in the form of a text message and/or email) to the recipient, indicating the presence of the message. The manner in which each respective communication is handled may be specified in a client specific database 121. The database may also include customer relationship management data, and context information associated with particular clients among the plurality of remotely-situated client entities.

The data-center communications server 101 and/or the client-managed server 107, may identify a plurality of speech characteristic parameters by analyzing at least one of words and tones of voice communications previously received by the plurality of remotely-situated client entities, and correlating the plurality of speech characteristic parameters with a particular sentiment. The data-center communications server 101 and/or the client-managed server 107 may determine a sentiment by comparing the sentiment of the received message with attributes stored in the client specific database. Similarly, the data-center communications server 101 and/or the client-managed server 107 may determine a criticality by comparing the issue or topic of the received message with attributes stored in the client specific database. In various example embodiments, the data-center communications server 101 and/or the client-managed server 107 may identify a plurality of speech characteristic parameters by analyzing at least one of words and tones of voice communications previously received by the plurality of remotely-situated client entities, and correlating the plurality of speech characteristic parameters with a particular sentiment. To that end, the data-center communications server and/or the client managed server 107 may identify thresholds delineating ranges for a plurality of sentiment scores, each respective sentiment score including a numerical value associated with an overall sentiment of the recorded message, determined by at least one of a frequency of audio of the recorded message, a wavelength or velocity of the recorded message, and an amplitude of the recorded message. The thresholds delineating the sentiment scores may be dynamic, in that they change over time and are modifiable by the client entity. Machine learning and/or artificial intelligence may implement such threshold determination, such that with added use, the thresholds for sentiment and criticality become more defined with a larger data set.

The data-center communications server 101 and/or the client-managed server 107 may identify a plurality of speech characteristic parameters by analyzing at least one of words and tones of voice communications previously received by the plurality of remotely-situated client entities, and correlating the plurality of speech characteristic parameters with a particular criticality indicative of an overall importance of the recorded message. As such, thresholds delineating ranges for a plurality of criticality scores may be identified, each respective criticality score including a numerical value associated with an overall importance of the recorded message, determined at least in part by key words included in the recorded message.

The data-center communications server 101 may retrieve a set of client-specific communication handling rules associating sentiment scores and criticality scores with communication handling processes. For instance, the client specific database 121 may store rules for each of the different clients served by the data communications provider, directing how communications meeting specific criteria are handled. Additionally, client-specific control engines 119 may specify a manner in which endpoint devices such as communication devices 105, 115-1, 115-2, and 115-3 are controlled, and/or a manner of routing of a data communications for a client account. In various example embodiments, handling of the message based on the sentiment and criticality scores includes during the recording of the message, routing the voice communication according to the client-specific communication handling rules. For instance, the recording of the message may be interrupted and the voice communication may be routed to a human operator based on the determined sentiment score or the determined criticality score.

Figure 1B:
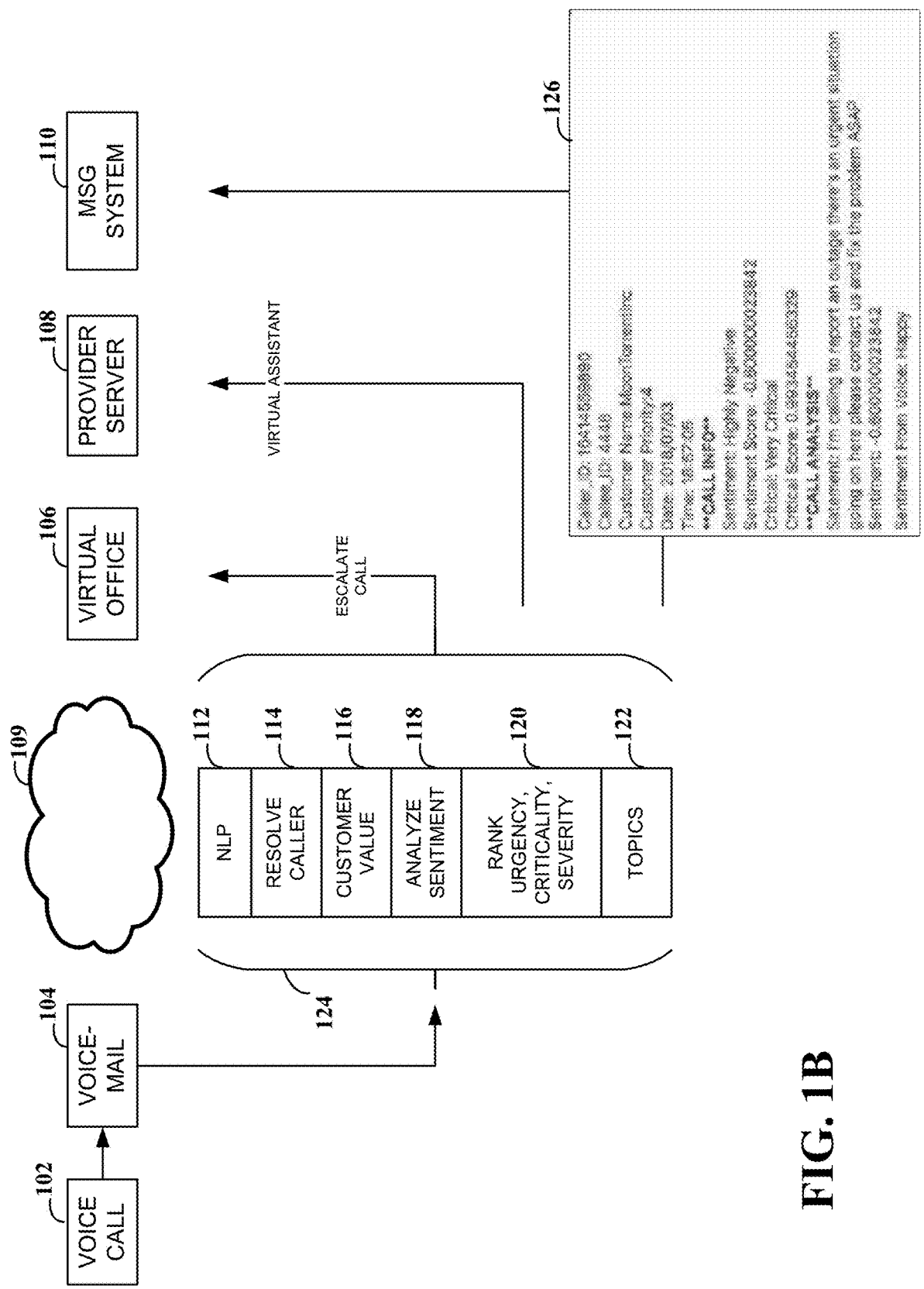
FIG. 1B illustrates a flow diagram illustrating an example method for monitoring user-data communications, consistent with embodiments of the present disclosure.

FIG. 1B illustrates a flow diagram illustrating an example method for monitoring user-data communications, consistent with embodiments of the present disclosure. Particularly, FIG. 1B illustrates an example embodiment including monitoring of a voice call. As illustrated, a voice call 102 may be placed by a data communications device (e.g., communications device 105 illustrated in FIG. 1A, and received by the data network (e.g., 109 illustrated in FIG. 1A). The user-data communication (e.g., the voice call 102 in this example embodiment) may be routed to the client entity, and in the event that the communication is not answered (e.g., the customer must leave a message), the voice call may be directed to a messaging system, such as a voicemail system 104. During the recording of the voicemail 104, the data network 109 may analyze the message using at least one of a plurality of content analysis processes 124, as described herein. For instance, the network 109 may implement natural language processing (NLP) 112 to identify key words in the voicemail 104. Additionally, the network 109 may resolve the caller (e.g., identify an individual and/or organization that placed the call) 114, using such methods including caller identification and/or reverse lookup. Based on the identity of the caller, different handling processes may be implemented. For example, calls from one client may be sent to voicemail, whereas calls from a different client may be routed to a live agent upon receipt instead of to a voicemail system. Additionally, the network 109 may identify a customer value 116 and route the call/user-data communication based on the overall value of the customer. For instance, one client may be highly valuable to the client entity because they purchase a large volume of goods and/or services from the client entity. Accordingly, calls and/or user-data communications from the high value client may be handled differently than calls and/or user-data communications from a lower value client. As an illustration, calls and/or user-data communications from the high value client may be sent to a particular representative and/or department of the client entity rather than a voicemail system, whereas calls and/or user-data communications from the lower value client may be sent to the voicemail system if a representative is not available.

Additionally and/or alternatively, the network 109 may analyze the sentiment 118 of the voicemail 104. As described herein, the sentiment may reflect an overall emotion and/or human reaction represented in the recorded message, such as may be determined by a frequency of audio of the recorded message, a wavelength or velocity of the recorded message, and an amplitude of the recorded message. For instance, a caller that is screaming on the voicemail 104 would have a different sentiment as measured by the volume of the message, as opposed to a caller that is speaking in a low and calm volume. As another illustration, a caller that is panicked may have a faster pace of speech as opposed to the slow speaking pace of a calm caller. The faster paced caller would have a different sentiment than the slower paced caller. Based on the determined sentiment 118 of the voicemail 104, different handling processes may be implemented. For example, a caller with a poor sentiment (e.g., the caller is agitated and/or angry) may be routed to a customer service representative, whereas a caller with a good sentiment (e.g., the caller is calm and/or happy) may be routed to a voicemail system.

Additionally and/or alternatively, the urgency, criticality, and/or severity 120 of the voicemail 104 may be analyzed by the network 109. The urgency may indicate a temporal (e.g., time-based) sensitivity of the call, such as determined using the NLP processes 112. For instance, if a caller explains that they need to speak with a representative "as soon as possible," a higher level of urgency may be assigned to the voicemail 104 as opposed to a caller that says they need to speak with a representative "as time permits." The criticality of the voicemail 104 may indicate how important the content of the call is to the caller. For instance, if the caller indicates that their entire communication system is down, the criticality of the voicemail 104 may be greater than if the caller indicates that their shared messaging system is down. Additionally, the severity of the voicemail 104 may indicate how bad the problem is for the caller. As an illustration, if the caller indicates that the phone system is down for 2 out of 100 branch offices, a lower severity may be assigned to the voicemail than if the caller indicates that the phone system is down for 100 out of 100 branch offices. Based on the urgency, criticality, and/or severity of the voicemail 104, different handling processes may be implemented.

As yet another illustration, the topic and/or topics 122 of the voicemail 104 may be identified and different handling processes may be implemented in handling the user-data communication. For instance, using NLP 112, the topic(s) of the voicemail 104 may be identified. Voicemails pertaining to one topic may be handled differently than voicemails pertaining to a different topic.

Based on the various content analysis processes 124 implemented, different handling processes may be utilized to address the user-data communication (e.g., the voice call 102 illustrated in FIG. 1B). For instance, if based on the content analysis processes 124, the voicemail 104 is to be escalated to a live agent, the voicemail 104 may be interrupted and the voice call 102 may be routed to a representative via a virtual office system 106. As another illustration, if based on the content analysis processes 124, the voicemail 104 is to be routed to a virtual assistant system for additional processing and/or additional services for the caller, the voicemail 104 may be interrupted and/or routed to a data-communication provider server 108 for accessing the virtual assistant. As yet a further illustration, if based on the content analysis processes 124, a group of team members are to be notified of the call 102, a message 126 may be sent to a message system 110 connecting a plurality of representatives (e.g., employees or end-users) of the client entity with information about the voicemail 104. The message may include information identifying the caller, the priority of the customer, the date and time of the call, and additional information. The message 126 may include a sentiment analysis, indicating that the voicemail 104 was highly negative, and very critical, with a sentiment and criticality score. The message 126 may also include a call analysis which includes a transcription of the call and a sentiment as determined from the voice of the caller. As illustrated in message 126, the sentiment as determined from the tone of the voice of the caller may differ from the sentiment as determined from the content of the voicemail. As such, different sentiment scores may be represented in the message 126.

Figure 2:
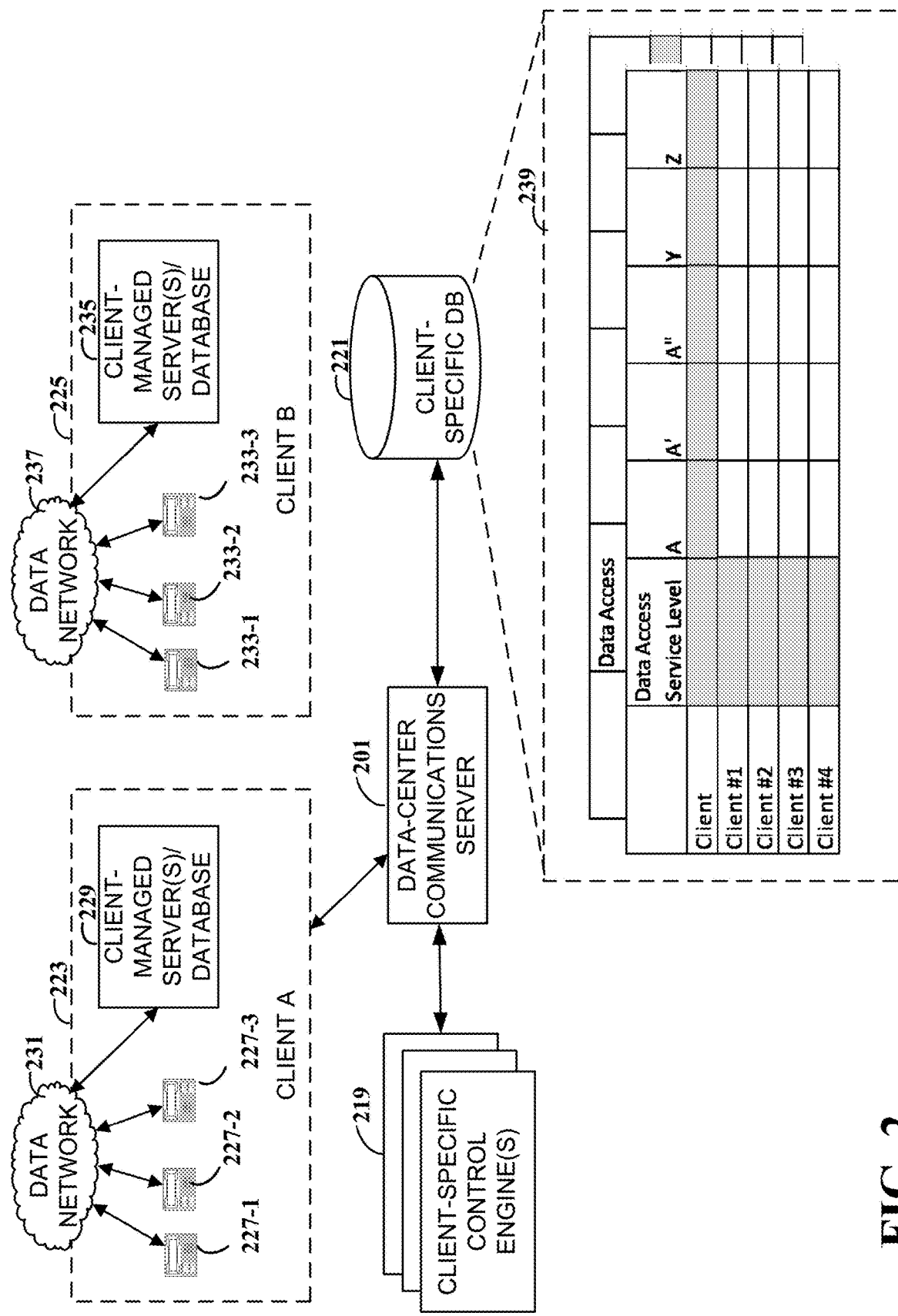
FIG. 2 illustrates a block diagram of an example data communications system for client-specific data communications monitoring, consistent with the present disclosure.

FIG. 2 illustrates a block diagram of an example data communications system for client-specific data communications monitoring, consistent with the present disclosure. The system includes a data-center communications server 201 configured to provide data communications for a plurality of endpoint devices 227-1. 227-2, 227-3, 233-1, 233-2, 233-3, connected in one or more data networks 231 and 237. The endpoint devices may include data communications-enabled devices (e.g., IP phones, smart phones, tablets, and/or desktop computers with appropriate data communications software applications) and/or non-data communications endpoint devices (e.g., plain old telephone service (POTS) telephones and cellular-capable devices). Each endpoint device is respectively associated with an account of a respective client. Endpoint devices may be associated with a particular client account by registering the endpoint device with a particular client account serviced by the data communications server. Registered devices for each client account may be listed in a respective account settings file (not shown) stored by the data-center communications server 201. In this example, endpoint devices 227-1, 227-2, and 227-3 are associated with an account 223 for a first client A and endpoint devices 233-1, 233-2, and 233-3 are associated with an account 225 for a second client B.

The system includes one or more processing circuits configured to implement client-specific control engines 219, which are configured to adjust the data communications provided for each client account according to a respective set of control directives. For instance, the client-specific control engines 219 may adjust a manner in which endpoint devices 227-1, 227-2, and 227-3 are controlled, and/or a manner of routing of a data communications for a client account, by generating client-specific sets of control data to the data-center communications server 201. For example, the client-specific control engines 219 may generate client-specific sets of control data by processing the respective set of control directives for the account in response to communication event data or other data prompts received from the data-center communications server 201.

As previously described, client-specific control engines 219 may be used to facilitate control of endpoint devices associated with a client device. The control of the endpoint devices may be associated with a variety of virtual office features including, for example, data communications services such as VOIP calls, audio and/or video conferencing, IPBX exchange servers, packet switching, and traffic management as well as non-data communications services including, but not limited to, website hosting, remote data storage, remote computing services, virtual computing environments. One or more of such virtual office features may be provided, for example, by a cloud computing network having one or more servers configurable to provide a data communications system for a plurality of clients.

Each respective client entity may have a client-managed server and/or database. For instance, client A 223 may be associated with a client managed server or database 229, whereas client B 225 may be associated with a client managed server or database 235. The client-managed server may facilitate the routing of data communications between the respective endpoint devices and the data-center communications server. Similarly, the client-managed servers may, in some example embodiments, analyze the sentiment and criticality of communications sent to and/or received by the respective endpoint devices, as discussed herein. In some example embodiments, each respective client entity may have a database storing client-specific preferences correlating different sentiment scores and criticality scores with different handling processes.

Additionally and/or alternatively, the data-center communications server 201 may be communicatively coupled with a client specific database 221, storing service level subscriptions 239 for each of a plurality of client entities. For example, the data communications service provider may provide a plurality of different service levels for the clients. Each disparate service level may provide additional services and/or information to the client entity, relative to past communications handled and subsequent communications to be handled by the service provider. For example, Client A 223 and Client B 225 may be associated with a home improvement store and an adhesives manufacturer, respectively. Service level A, which may be offered to both Client A and Client B, may be associated with routing communications for Client A and Client B, and also providing information to the clients regarding customer purchase data. The purchase data may include information about how many products were purchased, when they were purchased, which products were associated with problems and/or an increased number of customer complaints, and the like. Similarly, a second service level (e.g., service level A') may include the services of the first service level (e.g., service level A) but also information on venue and regional demographics. For instance, Service level A', which may be offered to both Client A and Client B, may be associated with routing communications for Client A and Client B, providing information to the clients regarding customer purchase data, and providing information about demographic populations that are purchasing their products, demographic information about customer complaints, and demographic information about other customer service issues. A third service level (e.g., service level A") may include the services of service level A' but also information on venue and relative pricing grouping. For instance, service level A", which may be offered to both Client A and Client B, may be associated with routing communications for Client A and Client B, providing information to the clients regarding customer purchase data, providing information about demographic populations, and information regarding relative prices which each demographic population is willing to spend. Additional service levels (e.g., service level Y and service level Z illustrated in FIG. 2) may be specified. Each respective client entity (e.g., client #1 through client #4) may have a specified level of data service access provided by the data-center communications server 201.

Figure 3:
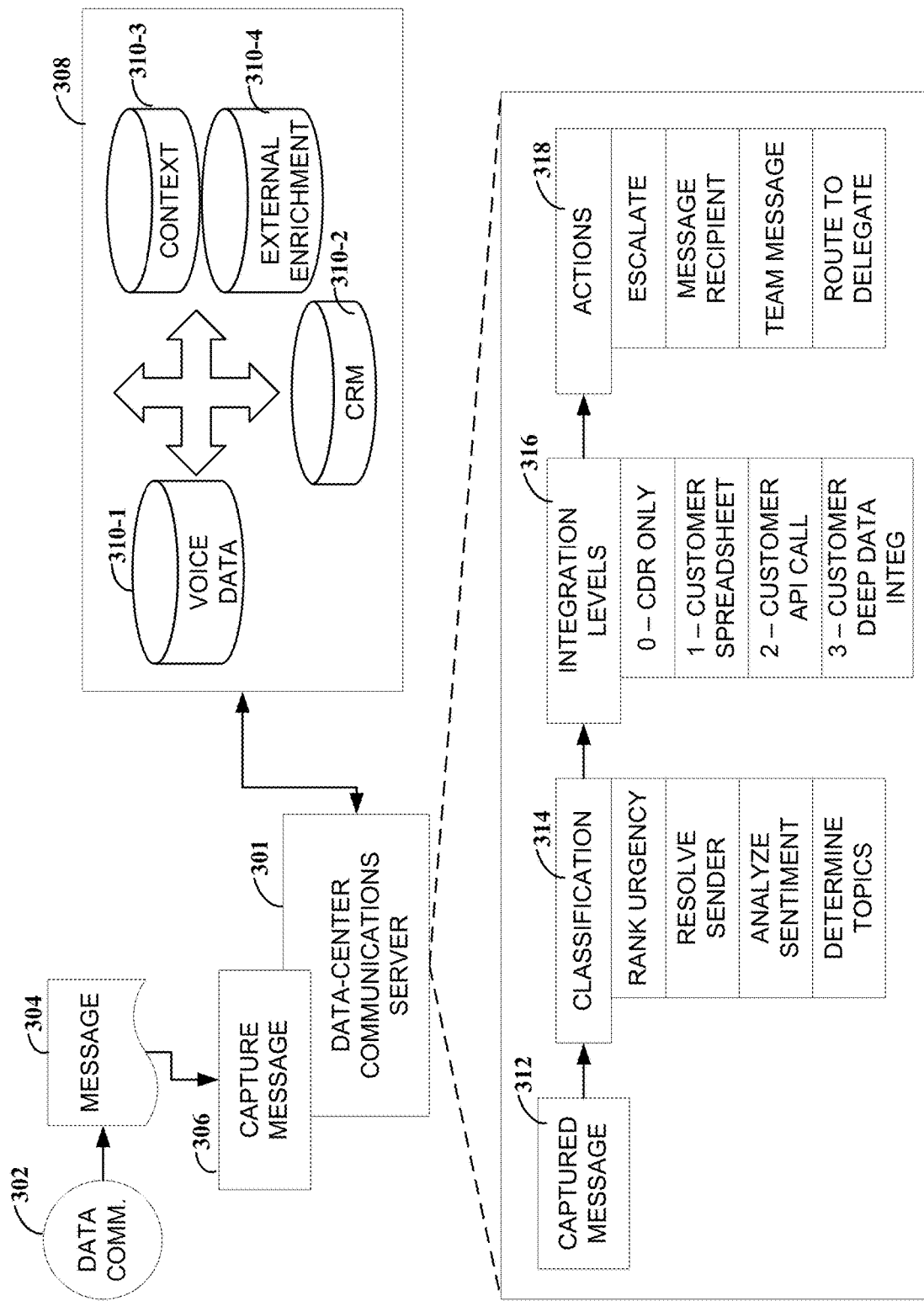
FIG. 3 illustrates a flow diagram illustrating an example method for monitoring user-data communications, consistent with embodiments of the present disclosure.

FIG. 3 illustrates a flow diagram illustrating an example method for monitoring user-data communications, consistent with embodiments of the present disclosure. In connection with these specifically-illustrated examples, data communications endpoint devices connected in a data network are configured to place and receive data communications between other data communications endpoint devices, and/or between non-data communications endpoint devices, as discussed with regards to FIGS. 1A and 2. Non-data communications endpoint devices may include, for example, plain old telephone service (POTS) telephones and cellular-capable devices, which might also be data communications capable (e.g., smart phones with appropriate data communications software applications). The various endpoint devices include circuitry that is specially configured to provide communications functions that include interfacing with the appropriate circuitry of the communication service provider used by the corresponding endpoint device. In many contexts, a data communications endpoint device is a data communications-capable telephone commonly referred to as IP phones. The data communications endpoint devices can include, but are not limited to, desktop computers, mobile (smart) phones, laptop computers, and tablets. When each of the endpoint devices originates or receives a communication in a telephone network, each can be characterized or referred to as an addressable communication endpoint.

The communication routing and other services for the data communications system can be provided by one or more data-center communications servers 301 within a cloud services system (e.g., configured to provide virtual office features to customers of the data communications provider). In particular example embodiments, the data-center communications servers 301 can be located within the cloud services system (e.g., data network 109 illustrated in FIG. 1A). The cloud services system also includes one or more provider hosted client-specific control engines, configured as described with reference to 119 in FIG. 1A. A client-specific control engine may also be implemented locally by a client (e.g., by a client-managed server as illustrated in FIG. 1A at reference numeral 107, and in FIG. 2 as reference numerals 229 and 235). In some embodiments, data centers can be part of a cloud-based system where the hardware providing the cloud services is located in a number of different data centers with different physical locations. Consistent with embodiments, the cloud services can include SIP servers, media servers, and servers providing other services to both data communications endpoint devices and the users of the data communications endpoint devices. In some instances, the various servers, including the data-center communications server(s), can have their functions spread across different physical and logical components. For instance, a cloud-based solution can implement virtual servers that can share common hardware and can be migrated between different underlying hardware. Moreover, separate servers or modules can be configured to work together so that they collectively function as a single unified server.

A particular example of a data-center communications server uses session initiation protocol (SIP) to handle various communication functions (e.g., communication setup and tear down); however, the various embodiments discussed herein are not necessarily limited thereto. Consistent with the above and other embodiments disclosed herein, the data communications servers can be configured to establish a portion of the communication from the data communications endpoint devices to another data communications endpoint device, or to a gateway.

As illustrated at 302 in FIG. 3, a data communication may be received from an endpoint device. In various example embodiments, the transmission of the data communication may be facilitated via a computing server configured and arranged to interface with a plurality of remotely-situated client entities to provide data communications services on a subscription basis. Each respective client entity may be associated with a different respective client-server, as described herein. As such, the transmission and receipt of such data communications may be facilitated by a processing circuit, such as the respective client-server, communicatively coupled to the computing server and configured and arranged to provide data communications services to the various endpoint devices of the client entity.

Upon receipt of a respective data communication 302, the client-managed server may direct the received communication to a message recording system. In some example embodiments the received communication may be a voice call, in which case the voice call may be routed to a voicemail recording system. As described herein, the received communication may be addressed to a client among the plurality of remotely-situated client entities served by the data-center communications server 301. A message 304 may be generated, corresponding to the data communication 302, such as if the sender of the data communication were to record a voicemail via the data-center communications server 301.

During recording of the message, parameters of the message may be determined. For instance, at 306, the message may be captured in data form such that various aspects of the message may be analyzed. In example embodiments in which the data communication is a voice message, the captured message 304 may be transcribed or otherwise converted into a script which may be analyzed by the data-center communications server 301. For instance, during recording of a message associated with the received voice communication and on the message recording system, the data-center communications server 301 may analyze speech characteristic parameters of the message.

As discussed herein, during recording of the message, the data-center communications server 301 may determine a sentiment score and a criticality score for the message based on the analyzed speech characteristic parameters. In various example embodiments, the data-center communications server 301 can determine the sentiment score and the criticality score for the message by identifying key words in the message, analyzing natural language of the message during recording of the message, and determining at least one topic of the recorded message. Based at least in part on the identified key words, the received voice communication can be classified. For instance, the sentiment score and the criticality score for the message may be determined by identifying a tone of the message. In such example embodiments, the speech characteristic parameters may be selected from the group consisting of: a frequency of audio in the message, a wavelength or velocity of the audio in the message, an amplitude of the audio in the message, and a combination thereof, and the tone may be determined from such speech characteristic parameters.

In various embodiments, the received voice communication may be classified at least in part based on the sentiment score or the criticality score. In classifying the received communication, the data-center communications server may retrieve from a plurality of sources 308, data associated with the particular client entity to which the communication was directed. For instance, the data-center communications server 301 may retrieve from a client-specific database (such as 221 illustrated in FIG. 2), a set of rules associating the voice communication with at least one communication handling process. The data-center communications server 301 may also access customer relationship management (CRM) data from a CRM server 310-2, including information about the particular client entity, services and/or products purchased by the particular client entity, previous communications with the particular client entity, and names and contact information of individuals associated with the client entity. Additionally and/or alternatively, the data-center communications server 301 may access a voice data server 310-1, which includes audio recordings from previous communications with the particular client entity, transcripts from previous communications, and/or information about such previous communications with the particular client entity. The CRM server 310-2 and voice data server 310-1 may further be in communication with a context server 310-3 and an external enrichment server 310-4. The external enrichment server 310-4 may include information regarding communications services accessed by the plurality of remotely-situated client entities, the communications services including an email system and a text-based chat system, among others. The context server 310-3 may identify a context of the voice communication based on the CRM data, information in the email system, or information in the text-based chat system. The data-center communications server 301 may further be in communication with each of the voice data server 310-1, CRM server 310-2, context server 310-3, and external enrichment server 310-4. As such, the data-center communications server 301 may determine the sentiment score or the criticality score based at least in part on an identified context of the voice communication.

As described previously herein, the data-center communications server may retrieve from a database communicatively coupled to the processing circuit and the computing server, a set of rules associating the voice communication with at least one communication handling process. For instance, each respective client entity may specify a manner in which incoming communications should be handled in response to a sentiment score and/or criticality score reaching a specified threshold. Accordingly, the data-center communications server may, during recording of the message, process the voice communication according to a set of rules associated with the particular client entity and retrieved from the client-specific database. As an illustration, the data-center communications server may process the voice communication by interrupting recording of the message and routing the voice communication to a live operator, responsive to a threshold for the sentiment score or the criticality score being satisfied. The caller may receive a message indicating that the message has been interrupted and the call is being routed to a live agent for handling. Example embodiments are not so limited, however, and the received data communication may be handled in additional and/or alternative manners. For instance, the data-center communications server may process the voice communication by sending a message to a recipient of the voice communication, responsive to a threshold for the sentiment score or the criticality score being satisfied. Such message may be sent to the target recipient by email, text message, and/or chat message during recording of the message to urgently alert for the recipient, the existence of the message. As another illustration, the data-center communications server may provide the recipient with a selectable option to answer the voice communication during the recording of the message, responsive to the threshold for the sentiment score or the criticality score being satisfied.

In some example embodiments, the data-center communications server may determine the criticality of the voice communication based on a determined topic of the voice communication, a determined sentiment of the voice communication, or an identity of an individual or organization which originated the voice communication. Various levels of analysis may be implemented by the data-center communications server 301 in order to determine the sentiment and/or criticality of a respective data communication. For instance, the captured message 312 may first be classified at 314. In classifying the captured message, an urgency and/or criticality of the captured message may be identified. The urgency may refer to or include a level of time-based sensitivity of the received communication, whereas the criticality may refer to or include a relative importance of the topic of the communication (which may or may not be urgent). Additionally, the sender of the communication may be identified. As discussed herein, the identity of the sender (e.g., the individual and/or the organization which the individual is associated with) may assist in a determination of the sentiment and/or the criticality. During the classification 314, the sentiment of the communication is analyzed, and at least one topic of the communication may be identified, as discussed herein.

Additionally, a number of integration levels 316 may be implemented, based on the service level associated with the particular client entity. For instance, a particular client entity may purchase a base level (e.g., level 0) integration level in which communications from the customer are rerouted based on the identified sentiment and/or criticality. Similarly, the client may purchase a second level (e.g., level 1) integration level in which communications from the customer are rerouted, but a customer spreadsheet is also maintained for rerouting such communications, and data is collected which may be used in subsequent communication routing, as discussed herein. A third integration level (e.g., level 2 integration) may provide a customer application programming interface (API), and a fourth integration level (e.g., level 3 integration) may provide a deep data integration for routing of communications. In the level 3 integration, data from databases 310-1, 310-2, 310-3, and 310-4 may be used to route and/or respond to incoming data communications such as data communication 302, and various customer data may be collected and provided to the client entity as discussed with regards to FIG. 2.

A number of actions 318 may be selected and/or implemented based on the classification 314 and the integration levels 316 specified for each respective client entity. For instance, a particular client entity may specify that if a particular sentiment and/or criticality score is met, then the data communication is escalated to a particular level of customer service representative. In some embodiments, the communication may be escalated to a particular individual. Additionally and/or alternatively, the communication may be escalated to a particular group. As another illustration, the action 318 selected based on the sentiment and/or criticality may include sending a message to the recipient. For instance, if a voice call is placed to Jeff Smith, and the voice call meets a particular criticality score (e.g., the call is about "project purple") then Jeff Smith may be sent a message by a secondary means such as by email, text message, or the like. In yet another illustration, a group of individuals and/or a team may be sent a message when a particular data communication is received. For instance, if the data communication 302 includes key words and/or phrases which suggest that the customer is communicating about a system failure (e.g., "my application is not running at all and I need to communicate with my clients immediately!"), the data communication may trigger a message to a team of IT professionals which are capable of addressing the system failure and/or are otherwise specified as a team which is responsible for responding to such system failures. Additionally and/or alternatively, a particular client service representative and/or delegate for a customer may be contacted for handling and/or otherwise responding to the received communication.

While particular actions 318 are specified in FIG. 3, it is noted that each respective client entity may customize and/or alter the actions to be provided for received data communications. Referring again to FIG. 2, each of Client A and Client B can specify thresholds, triggers, key words, tones, phrases, and/or other parameters that may be used to classify incoming data communications at 314. Each of Client A and Client B can specify a level of integration that should be implemented, which specifies a number of different data sources that should be accessed in classifying communications and selecting particular actions to be implemented. Such integration levels may further assist in machine learning, as data from external sources may allow for the prediction of sentiment and/or criticality of various data communications. Additionally, each of Client A and Client B can specify particular actions to be performed when such classifications are met. As discussed herein, the actions may be dynamic, in the sense that each client entity can view, modify, add and/or delete actions to be performed, and otherwise interact with the system to improve the functioning of the machine learning algorithms described herein.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a communication control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server (e.g., providing a corresponding software platform) includes a computer processing circuit that is configured to provide services to other circuit-based devices. Moreover, various other circuit-related terminology is used in a similar context as apparent to the skilled artisan, as is the case with each such apparatus which refers to or includes otherwise known circuit-based structures. As a first example, a (data communications) endpoint device (or endpoint) refers to or includes a communications circuit such as one enabled to communicate over a broadband network such as the Internet or a cellular communications network (e.g., computer) processing circuits as configured to establish data communications sessions with other endpoint devices and such endpoints include, e.g., personal computers, IP-enabled mobile phones, and tablet computers. Also, a client entity refers to or includes an endpoint device (as above) which is linked/associated with a client of a provider/operator of the company overseeing the data-communications server or data-center communications server. Further, a data-center communications server or data-communications server refers to or includes a computer processing circuit that is configured to provide data-communications services to other circuit-based devices. Moreover, a message recording system refers to or includes processing circuits configured to record a voice message. In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes). Activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. A computer-implemented method comprising:
    monitoring user-data communications corresponding to a user-generated message ("the message") while a virtual contact center, configured using at least one data-communications server, is processing the user-data communications for conveying the message, wherein the user-data communications involves at least one endpoint device from among a plurality of endpoint devices registered to receive data communications services provided by the at least one data-communications server;
    analyzing the message, while the user-data communications are being processed by the virtual contact center;
    determining, based on at least one of analyzed speech characteristic parameters and words used in the message, at least one of a sentiment score and a criticality score for the message; and
    processing the user-data communications relative to one of a plurality of target recipients (the target recipient) based on said at least one of a sentiment score and a criticality score being determined, by routing the user-data communications to the target recipient or by causing an automated voice to respond to the user-data communications.

2. The method of claim 1, further including using computer processing circuitry communicatively coupled to said at least one data-communications server, to determine or set at least one threshold criteria and using the at least one threshold criteria, as determined or set, for selecting the target recipient before said processing.

3. The method of claim 1, further including using a machine learning algorithm to assess one or more of the following attributes of the message: content, classification, severity, sentiment and topic.

4. The method of claim 1, further including using an artificial intelligence algorithm to predict, based in part on attributes of the message, an appropriate threshold criteria to be satisfied by attributes of the message before causing the target recipient to be selected.

5. The method of claim 1, wherein at least the sentiment score is determined based at least in part on the analyzed speech characteristic parameters.

6. The method of claim 1, wherein at least the criticality score is determined based at least in part on tone or words used in the message.

7. The method of claim 1, further including identifying at least one threshold criteria, and in response to said at least one threshold criteria being satisfied by the at least one of a sentiment score and a criticality score for the message.

8. The method of claim 1, wherein at least the sentiment score is determined and the sentiment score includes a numerical value associated with an overall sentiment of the message.

9. The method of claim 1, wherein the sentiment score is determined, by using a recording of the message, based on at least one of a frequency of audio in the recording, a wavelength or velocity of the recording, and an amplitude of the recording.

10. The method of claim 1, wherein the target recipient is a live operator interacting with the virtual contact center.

11. The method of claim 1, wherein the user-data communications are routed to the target recipient, via a user endpoint device which is from among the plurality of endpoint devices.

12. The method of claim 1, wherein said processing the user-data communications is carried out using computer processing circuitry, communicatively coupled to the at least one data-communications server, that performs said steps of analyzing, determining, and processing.

13. The method of claim 1, further including recording of the message and causing, based on the sentiment score and the criticality score being determined, said routing the user-data communications to the target recipient.

14. The method of claim 1, further including causing, in response to a threshold for said at least one of the sentiment score and the criticality score being determined and satisfied, an interruption of a recording of the message and in response to causing the interruption, selecting the target recipient and then performing said routing of the message to the target recipient.

15. The method of claim 1, wherein said analyzing the message includes analyzing at least one of words and tones of voice communications previously received by the plurality of endpoint devices.

16. The method of claim 1, wherein each of the plurality of target recipients is linked to or corresponds to a user-communications endpoint device that is registered to a client-managed server which is distinct from said at least one data-communications server.

17. The method of claim 1, further including identifying the speech characteristic parameters by analyzing at least one of words and tones of voice communications previously received by the plurality of endpoint devices.

18. The method of claim 1, further including discerning resolution of an issue linked to the user-data communications; and processing the user-data communications by routing the user-data communications to multiple ones of the target recipients in succession until the resolution is discerned.

19. A computer-implemented method comprising:
    monitoring user-data communications corresponding to a user-generated message ("the message") while a virtual contact center, configured using at least one data-communications server, is processing the user-data communications for conveying the message, wherein the user-data communications involve at least one endpoint device from among a plurality of endpoint devices registered to receive data communications services provided by the at least one data-communications server;

analyzing the message, while the user-data communications are being processed by the virtual contact center;

determining, based on at least one of analyzed speech characteristic parameters and words used in the message, at least one of a sentiment score and a criticality score for the message; and processing the user-data communications relative to one of target recipients based on said at least one of a sentiment score and a criticality score being determined, and in response, discerning resolution of an issue linked to the user-data communications.

20. A computer-implemented method comprising:

monitoring user-data communications corresponding to a user-generated message ("the message") while a virtual contact center, configured using at least one data-communications server, is processing the user-data communications for conveying the message, wherein the user-data communications involve at least one from among a plurality of endpoint devices registered to receive data communications services provided by the at least one data-communications server;

analyzing the message, while the user-data communications are being processed by the virtual contact center;

determining, based on at least one of analyzed speech characteristic parameters and words used in the message, at least one of a sentiment score and a criticality score for the message; and processing the user-data communications based on said at least one of a sentiment score and a criticality score being determined by using an algorithm that involves at least one of machine learning and artificial intelligence, and in response, discerning resolution of an issue linked to the user-data communications.

* * * * *